United States Patent [19]

Eichelberger, Sr.

[11] Patent Number: 4,909,948
[45] Date of Patent: Mar. 20, 1990

[54] ABOVE GROUND WASTE WATER DISPOSAL SYSTEM

[76] Inventor: Philip T. Eichelberger, Sr., 1415 Kathy, Arcola, Tex. 77583

[21] Appl. No.: 324,291
[22] Filed: Mar. 15, 1989

Related U.S. Application Data

[63] Continuation-in-part of Ser. No. 909,192, Sep. 19, 1986, abandoned.

[51] Int. Cl.$^4$ ............................ C02F 1/00; B01D 1/00
[52] U.S. Cl. ..................................... 210/742; 210/744; 210/104; 210/109; 210/121; 210/134; 210/138; 210/180; 210/258; 210/260; 210/747; 210/170
[58] Field of Search ............... 210/103, 104, 109, 121, 210/134, 138, 170, 180, 242.1, 258, 260, 742, 744, 747, 739

[56] References Cited

U.S. PATENT DOCUMENTS

| | | | |
|---|---|---|---|
| 3,337,455 | 8/1967 | Wilson et al. | 210/258 |
| 3,541,594 | 11/1970 | Wallace | 210/121 |
| 3,724,664 | 4/1973 | Lemberger et al. | 210/170 |
| 3,836,000 | 9/1974 | Jakubek | 210/258 |
| 3,951,803 | 4/1976 | Siegel | 210/260 |

Primary Examiner—Richard V. Fisher
Assistant Examiner—Cynthia L. Nessler
Attorney, Agent, or Firm—Darryl M. Springs; Kurt S. Myers; John R. Kirk, Jr.

[57] ABSTRACT

A method and apparatus for disposing of waste water above ground is disclosed. Effluent is deposited in a first tank wherein solids are broken down and liquified by a primary preconditioning unit. The preconditioned effluent is transferred to a second tank. A secondary conditioning unit in the second tank suspends liquid and solid particles in the tank air and vapor, vaporizes the suspended liquid and any entrained solid particulate material, and then discharges the vaporized material into the ambient atmosphere. An automatic control means senses vapor temperature and operates a stack damper and vacuum means which causes the vapor stream, thus preventing escape of non heat-treated vaporized materials. Another automatic control means activate the secondary treatment unit heater only when the liquid level of the second tank is within a preselected range.

15 Claims, 5 Drawing Sheets

ABOVE GROUND WASTE WATER DISPOSAL SYSTEM

CROSS-REFERENCE TO RELATED APPLICATION

This application is a continuation-in-part of application Ser. No. 909,192, filed Sept. 19, 1986, now abandoned.

BACKGROUND OF THE INVENTION

This invention relates to waste water disposal systems, and, more particularly, relates to methods and apparatus for disposing of waste water, septic material, sewage, and the like particularly in remote locations.

Septic waste water disposal systems have long been known in the art which provide for one or more underground septic fields. Sewage and waste water are typically delivered to these underground fields wherein, by well-known bacterial action, the material is broken down biologically and percolates and evaporates through the field. These systems are typically employed with private homes outside the jurisdiction of city and county sewage treatment facilities.

These septic disposal systems have long been associated with numerous troublesome problems. Not only are they frequently found to be unreliable generally, but under flooding conditions have been known to pollute rainwater and contaminate underground areas, thus posing serious health hazards. Such pollution has been found in fresh water lake areas and in areas where flooding high tidal water frequents coastal and lake areas, thus adding to contamination of lakes, bays, streams, and rivers. Moreover, in order to provide sufficient surface area for septic bacterial action and evaporation, and percolation, the underground evaporating field must typically be rather large, thus contributing to the cost of the system.

Accordingly, improved methods and apparatus were highly desired for disposing of waste water, particularly in rural locations, wherein septic or other available alternative waste treatment systems are not feasible. Such methods and apparatus are provided by the present invention wherein a technique is disclosed for above ground disposal of waste water material such as sewage, thus preventing pollution of underground areas and avoiding the oftentimes prohibitive cost of installing vast underground evaporating fields.

SUMMARY OF THE INVENTION

Methods and apparatus for above ground disposal of waste water materials such as sewage or the like are disclosed. In a preferred embodiment of the present invention, a waste water disposal system is provided comprised basically of a receptacle divided into first and second tanks, a primary preconditioning unit and secondary handling unit associated with the first and second tanks, respectively.

A waste water discharge pipe delivers the waste materials to be treated into the first tank. The discharge pipe includes a flapper valve carrying a position-sensitive switch interconnected to a timer/solenoid. When material to be treated is discharged through the pipe into the first tank, the flapper valve opens activating the switch and thus the timer/solenoid. A motor interconnected to the timer/solenoid is thereby activated for a preselected time period governed by the timer setting which, in a preferred embodiment, is nominally 5–15 minutes.

The motor shaft is interconnected to the primary preconditioner unit which has, as its primary function, the pretreatment of solid materials in the waste water material to be disposed of whereby such solid material is crushed, pulverized, and transformed into suspension as particulate matter in the liquid waste or a macerated slurry. More particularly, the primary preconditioning unit includes a generally cylindrical outer housing extending down into the first tank. Internally of the housing is the shaft interconnected to the aforesaid motor which carries a pair of lower impellers and an upper impeller. The housing terminates at its lower end in a lower aperture preferably spaced approximately 4 inches above the bottom surface of the receptacle. At the upper end of the housing, an elbow joint is provided having a discharge opening whereby fluid communication is provided of fluid contained in the first tank through the lower aperture, upwards through the internal annulus of the housing, and outwards of the discharge outlet of the elbow joint.

The lower two impellers and upper impeller are carried by the shaft interconnected to the motor and extending downwards coaxially and concentrically into the housing. Each time the motor is activated for a preselected time set by the timer/solenoid, the vertical shaft is caused to rotate, thus rotating the impellers. The lower two impellers cut up the solid material as it is drawn upwards. The upper impeller further crushes and liquifies this solid material into a macerated slurry which is then delivered by the impelling action outwards of the discharge opening of the elbow joint into the upper portion of the first tank. An inverted U-shaped transfer tube is provided extending across the partition separating the first and second tanks. When the fluid level in the first tank is sufficiently high, the liquid carrying pulverized particulate material and liquified by the primary preconditioning unit (a macerated slurry) is transferred through the transfer tube to the second tank. The inlet side of the U-shaped transfer tube disposed in the first tank has screen covered apertures in the walls of the tube, including the annular pipe opening. The discharge opening of the preconditioning unit housing is directed toward the screened inlets of the U-shaped transfer tube to "wash" the screens and remove accumulated particulate material adhering thereto. The secondary conditioning unit includes first and second telescoping pipe sections concentrically and coaxially arranged so as to extend vertically downwards into the second tank. The second pipe, which fits radially about the first pipe, is in longitudinally sliding engagement therewith. A float is adjustable along and about the second pipe section, and may be retained at a desired elevation relative thereto by retention means which are provided.

In this manner, the second pipe moves vertically as a function of the liquid waste material level in the second tank, inasmuch as the float responds to the level of the liquid material in the second tank. The upper end of the first pipe is interconnected to a vacuum motor which, in turn, has a discharge interconnected to a discharge stack. The telescoping second pipe section has a plurality of lower slots formed by longitudinal cuts in the end of the pipe and the float. A vapor communication circuit is provided from within the second tank, through the slots and the annulus defined by the first and second pipe sections, up to the vacuum pump, out the pump discharge, through the discharge stack and thence to the ambient.

The vacuum of the pump draws vapor in the second tank over the liquid surface through the slots and up the pipes, thus suspending liquid particles and entrained particulate matter in a carbureting-type action in the vapor thus drawn into the pipes. A heater in the discharge stack intermediate a damper and the vacuum motor heats and vaporizes the liquid and entrained particulate matter carried by the vapor drawn up the pipes by the vacuum pump, and purifies the resultant combined vapors at elevated temperatures (which, in a preferred embodiment, may preferably exceed 300° F.). When the float position is properly adjusted on the attached second pipe, the slots in the lower pipe section are adjacent to and just slightly above the liquid waste surface so as to optimize the draw and mix of liquid and air vapor into the pipes.

A temperature sensing transducer switch is provided in the stack between the damper and the heater for sensing when the temperature of the vaporized material equals or exceeds a preselected magnitude whereupon it activates a solenoid. The solenoid, in turn, activates the vacuum pump and opens the damper flap carried by the stack. At least one vertical rod is interconnected to the float and has a pair of stops and a corresponding limit switch interconnected to a second solenoid which, in turn, is connected to the aforesaid heater element of the secondary treatment unit. When the slurry level in the second tank moves up to a first level, upward movement of the rod caused by correlative movement of the float causes the first stop to activate the solenoid switch associated therewith, thereby energizing the heater. When the slurry fluid level drops to a second lower preselected level in functional relation to the positioning of the second stop on the rod, downward movement of the float, rod, and the second stop deactivates the solenoid switch, which, in turn, deactivates the solenoid, and de-energizes the heater.

In operation, waste material to be treated and disposed of is introduced into the inlet discharge pipe, thereby causing the flapper to open. Movement of the flapper thereby energizes the position switch to activate the timer/solenoid which, in turn, energizes the motor of the primary pre-conditioning unit for the preselected time predetermined by the timer. Waste material contained in the first tank is thereby drawn upwards through the lower aperture of the cylindrical housing portion of the primary preconditioning unit and vertically upwards through the annulus formed by the housing. The impellers transport this waste material upwards through the annulus of the housing, discharging it outwards back into the first tank at the upward level thereof through the discharge opening of the elbow joint into the screen inlet of the transfer pipe. The impellers provide the aforesaid function of breaking down the solid materials as well as provide the transport mechanism for continuously recirculating the waste from the lower housing inlet aperture to the discharge aperture and back to the lower inlet aperture.

Such preconditioned waste material is agitated into a macerated slurry contained in the first tank and transferred through the transfer tube into the second tank. As the slurry liquid level in the second tank rises, the float carries the second telescoping pipe upwards about the first pipe, causing the vertical actuating rod to rise vertically until the first stop activates the solenoid switch, whereupon the heater is activated. When the temperature sensor in the discharge pipe senses that the temperature is at the preselected temperature level or greater, such as 300° F., the solenoid connected to the sensor is activated. Power is thereby provided to the vacuum motor and to an electromechanical link to open the damper in the stack, thereby permitting material vaporized and purified by the heater to exit to the ambient through the discharge stack by reason of the vacuum draw.

As slurry material is thus vaporized, purified, and discharged from the second tank, if insufficient waste is pretreated in the first tank and not interjected into the second tank through the transfer tube, the float, second pipe, and rod, will move downwards as the level of slurry in the second tank drops as a result of vaporization and discharge of material through the stack. When the float lowers to the preselected second level determined by the second stop on the actuating rod, the rod deactivates the switch, thereby deactivating the solenoid switch and heater element energized thereby. In this manner, the heater is precluded from operating when there is insufficient waste level in the second tank. So long as the heater is activated and causes vaporization of the liquid material (sensed by a temperature element as having a temperature equal to or greater than the preselected temperature such as 300° F.), the temperature transducer element will activate a solenoid controlling the heater, thereby maintaining energization of the vacuum unit and maintaining the damper in the open position to permit discharging the vaporized material.

However, should this temperature not be reached (by reason of the heater being deactivated due to low fluid level in the second tank or by reason of the heater not having been activated for a sufficient time period to reach the prescribed temperature), the temperature transducer will sense this condition, thereby causing the solenoid connected thereto to deactivate the vacuum motor and damper. In this manner, raw non heat-treated vapor will be prevented from entering the ambient through the discharge pipe unless it has reached the desired temperature (as a result of the secondary handling unit) sufficient to have the desired effect of purifying, sanitizing, and deodorizing the vaporized liquid and entrained particulate material in the second tank.

BRIEF DESCRIPTION OF THE DRAWINGS

In order that the manner in which the above-recited advantages and features of the invention are attained can be understood in detail, a more particular description of the invention may be had by reference to specific embodiments thereof which are illustrated in the appended drawings, which drawings form a part of this specification. It is to be noted, however, that the appended drawings illustrate only typical embodiments of the invention and therefore are not to be considered limiting of its scope for the invention may admit to further equally effective embodiments.

In the drawings.

DETAILED DESCRIPTION OF PREFERRED EMBODIMENT

Figure 1:
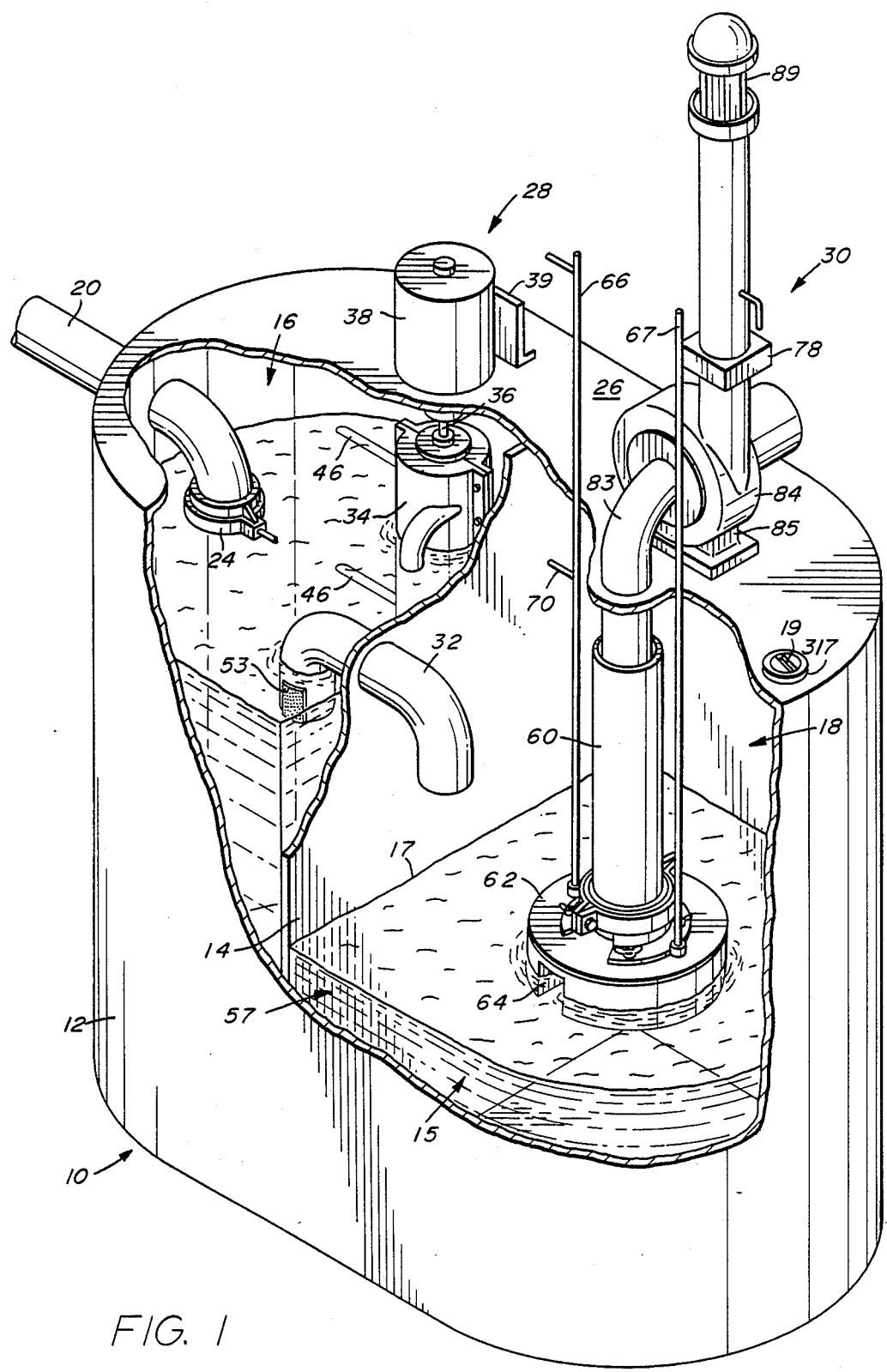
FIG. 1 is a perspective view, partly in section, of the waste disposal system of the present invention.
Figure 2:
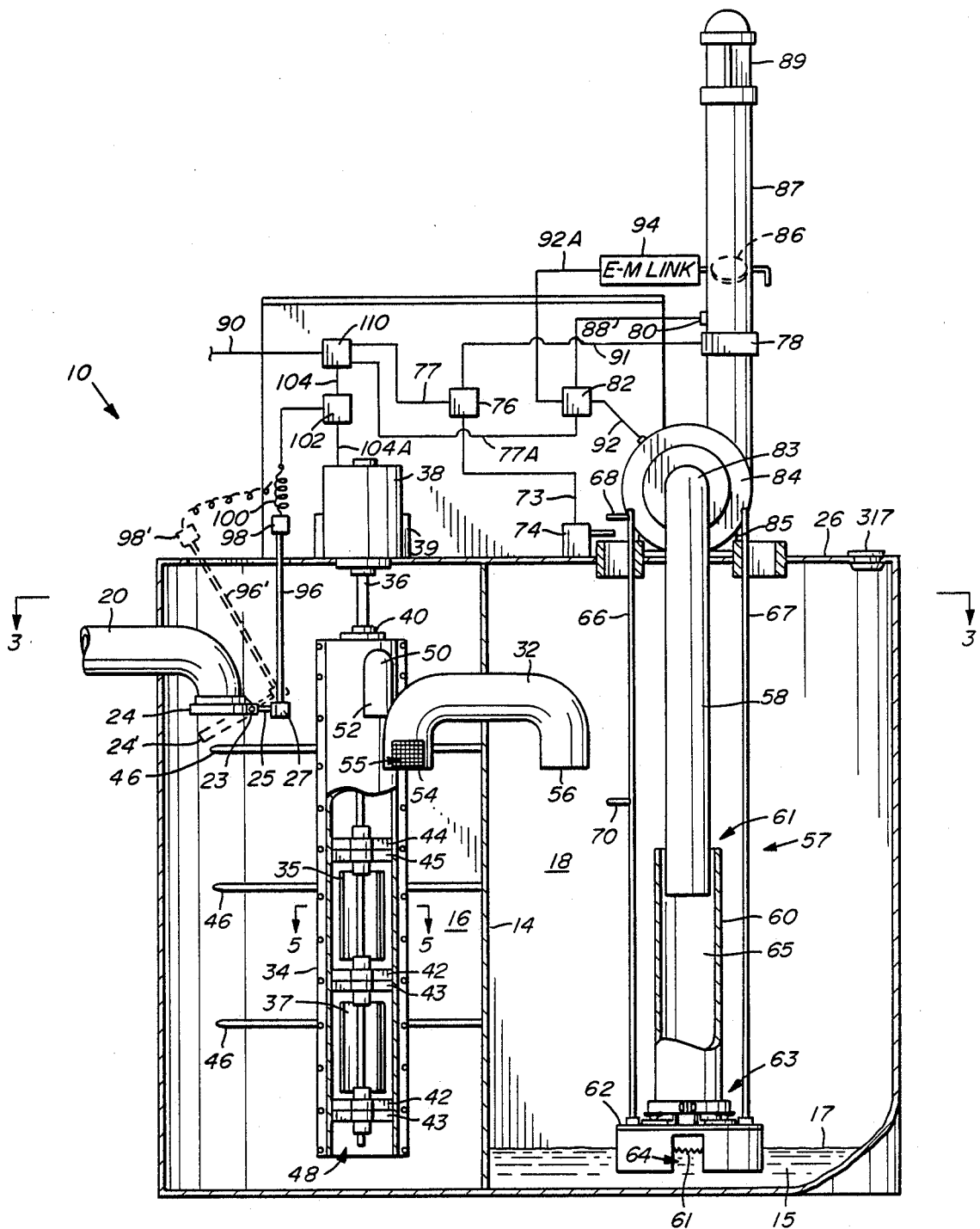
FIG. 2 is an elevation view, partly in section, of the waste disposal system depicted in FIG. 1.
Figure 12:
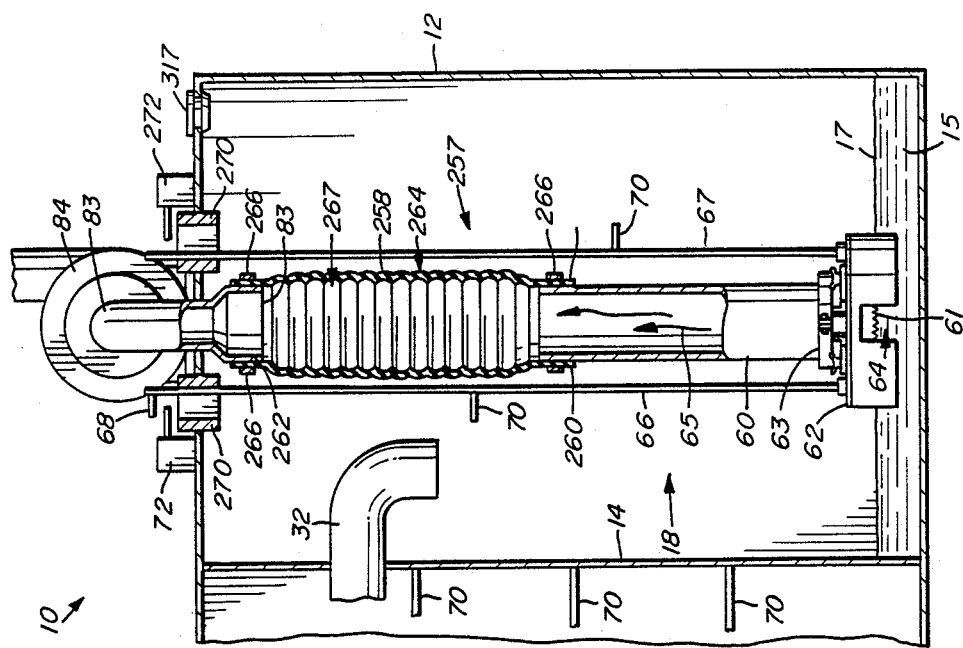
FIG. 12 is a side view, partly in section, of a portion of a second embodiment of the secondary conditioning unit of the apparatus depicted in FIG. 1.
Figure 3:
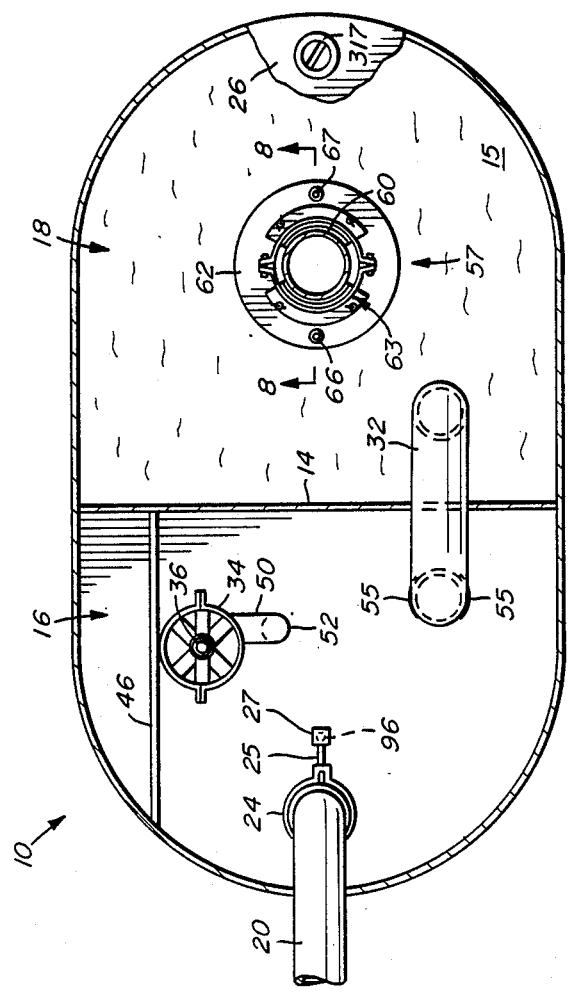
FIG. 3 is a top plan view, with the cover removed, of the waste disposal system depicted in FIG. 2.
Figure 4:
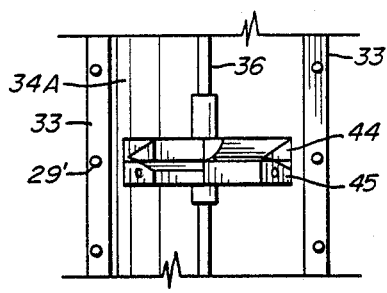
FIG. 4 is a frontal sectionalized view of a portion of the primary preconditioner unit portion of the apparatus depicted in FIG. 1.
Figure 4:
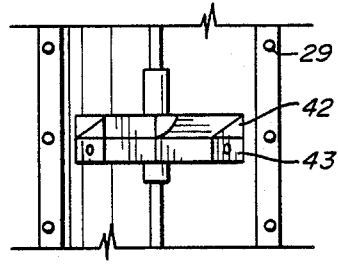
Figure 4:
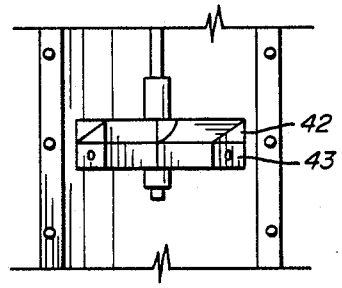

Referring to FIGS. 1, 2 and 3 there will be seen depicted therein generally a waste disposal system 10 of the present invention. The system 10 will preferably include a receptacle or tank 12 and a partition 14 which sections the receptacle into a waste water-receiving first tank 16 and a second tank 18 for mixing liquid contained therein received from the first tank with air or other vapor therein, purifying, and vaporizing the resultant mix, and releasing to the ambient atmosphere, as will hereinafter be described. A waste water discharge pipe 20 delivers the waste material to be treated from any location as desired to the internal cavity defined by the first tank 16. A flapper valve 24 provides a mechanical indication of the introduction of waste material through the pipe 20 into the first tank, such indication being used in an automatic control means as hereinafter described. A cover 26 encloses the first and second tanks, and further provides support for a primary preconditioning unit 28 and a secondary treatment unit 30, both units being downwardly and pendently disposed therefrom. A transfer tube 32 in the shape of an inverted "U" is carried by the partition 14 and has an intake 54 extending into the first tank 16 and a discharge 56 extending into the second tank 18, thereby providing fluid intercommunication between the first and second tanks. An opening 317, which may carry an appropriate filter 19, may be provided in the cover 26 or other appropriate location in receptacle 12 to permit entry of return ambient air into the receptacle 12 when the air inside of tank 18 is being removed by means of a pump 84 as will hereinafter be explained in greater detail.

The primary preconditioning unit 28 will now be described in greater detail with reference to FIGS. 1-5. A cylindrical housing 34, comprising a pair of semi-circular sections 34A and 34B, is vertically disposed so as to extend downwards into the fluid contained by the first tank 16. A shaft 36 extends downwards from a motor 38 which is supported by the cover 26 by means of a mounting bracket 39. This shaft 36 is preferably vertically disposed so as to be in coaxial and concentric alignment within the housing 34. A bushing/support collar 40, mounted in the top of the housing 34, provides support for the housing 34 and permits ease of rotation of the shaft 36 therethrough. A pair of lower impeller/cutters 42 and an upper impeller/smasher 44 are disposed on the shaft 36. Bearing/spacers 43 are mounted internally of the housing 34 and receive the shaft 36 so as to maintain it in the concentric spaced relation relative to the housing 34 and also provide a cutting surface in contact with the impeller/cutter blades 42 and cooperating therewith as will be hereinafter explained in greater detail.

Similarly, a bearing/spacer 45 is internally mounted in housing 34 to receive shaft 36 for mounting the shaft in concentric alignment within the housing 34 and also provides a chopping or smashing surface in contact with the impeller/smasher blade 44 and cooperating therewith as will be hereinafter explained in further detail. A lower aperture 48 in the housing 34 is positioned adjacent the bottom of the first tank 16. A preferred spacing of opening 48 from the bottom of tank 16 is approximately 4 inches. At the upper end of the housing 34, an elbow joint 50 is connected having a discharge aperture 52. Baffles 35 and 37 are mounted within housing 34 to prevent rotating motion of the liquid within housing 34 which would interfere with the cutting and smashing action of blades 42 and 43. Transverse supports such as brackets 46 are disposed in a vertical spaced relationship within tank 16 to support the housing 34 and maintain it in a vertical position within tank 16.

The hereinbefore mentioned transfer tube 32 extends through the partition 14 and provides a means for the material contained in the first tank, when it reaches a preselected level, to be transferred therethrough to the second tank 18. The portion of the U-shaped tube 32 projecting into tank 16 also has at least a pair of openings 55 disposed in the sides of the tube portion within tank 16 for permitting entry of the material in tank 16. However, the aperture 54 and the apertures or openings 55 are covered with a "screen" 53 in order to screen out solid materials above a selected screen mesh size floating on the surface of the liquid material in tank 16 to prevent entry of the solid materials into the tank 18. The mesh size of the screen 53 will be selected to permit passage of a desired particle size of material. The discharge opening 52 of the elbow 50, mounted on the upper end of housing 34, is positioned to discharge the macerated slurry (liquid and carried particulate solids) from inside housing 34 into the screened openings 55 disposed in the end of pipe 32 spaced adjacent the housing 34. The flow of the slurry from the discharge elbow 50 unto the end of pipe 32 disposed in tank 16 provides a washing or turbulence action for washing solid particulate materials from the surfaces of the screens 53. Such a "washing" action assists in keeping the screens 53 from becoming clogged with oversized particulate matter that is carried to the intake openings 54 and 55.

Figure 6:
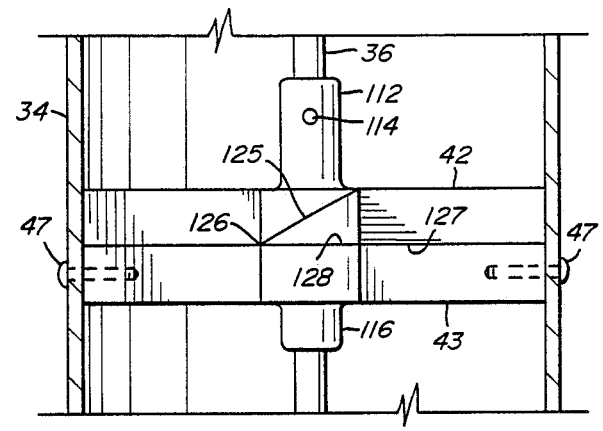
FIG. 6 is fragmentary view of a portion of the preconditioner unit showing details of the pair of lower cutting blade assemblies of the preconditioner unit.
Figure 7:
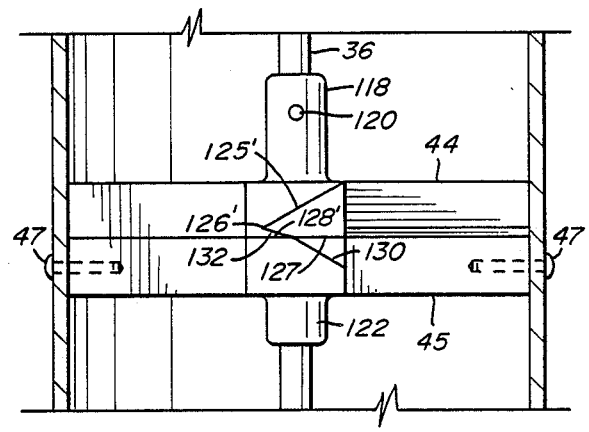
FIG. 7 is a fragmentary view of a portion of the preconditioner unit showing details of the upper swashing blade assembly of the preconditioner unit.
Figure 5:
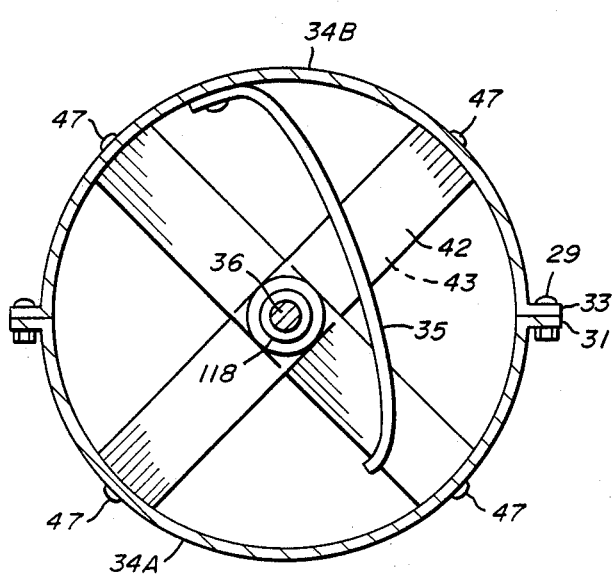
FIG. 5 is a horizontal cross-sectional view of the preconditioner unit as taken along lines 5—5 of FIG. 2.
Figure 8:
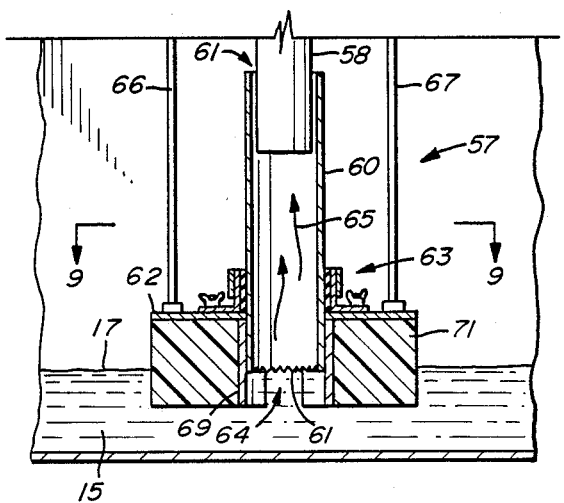
FIG. 8 is a side view, partly in section, of a portion of conditioning the secondary unit of the apparatus depicted in FIG. 1.
Figure 9:
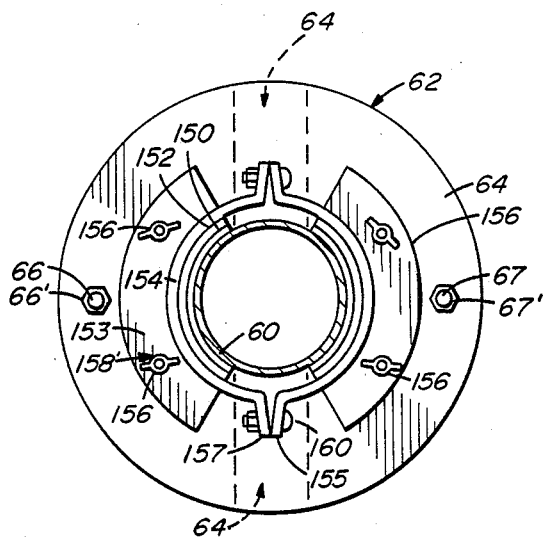
FIG. 9 is a horizontal cross-sectional view of secondary conditioning unit as taken along lines 9—9 of FIG. 8.
Figure 10:
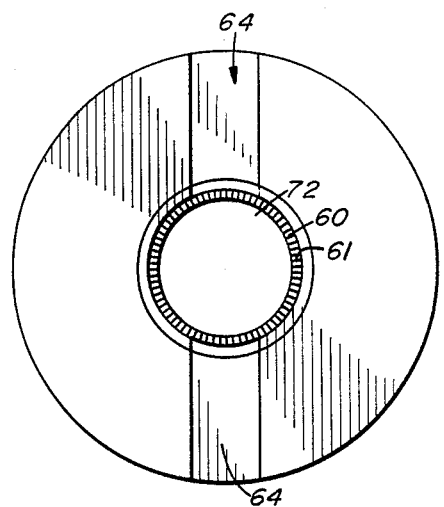
FIG. 10 is a bottom or end view of the float and one pipe section of the secondary conditioning unit as shown in FIG. 8.

The housing 34 construction and the impeller/cutting mechanisms carried therein will be further described with additional references to FIGS. 6 and 7. As above-described with reference to FIGS. 1-5, the cylindrical housing 34 comprises a pair of identical semicylindrical halves 34A and 34B, each having facing flanged longitudinal edges 31 and 33, respectively. The flanged edges 31 and 33 of half segments 34A and 34B, respectively, are adapted for mating contact and are attached by means of fasteners 29 cooperating with registering holes or apertures 29' provided in the flanged edges 31 and 33. When paired together, the mating opposed half sections 34A and 34B form the cylindrical housing 34. As hereinabove described, baffle plates 35 and 37 are mounted within housing 34 and project transversely past the shaft 36 to provide a plurality of transverse vertical baffles disposed between impeller pairs lower 42–upper 42 and upper 42–44. As previously described, the baffles 35 and 37 prevent rotational (swirling) motion of the liquid as it is forced upwardly through the pre-conditioning unit housing 34 in order to prevent any vortex action occurring within the housing which would interfere with the cutting, pulverizing and macerating action performed by the impeller/cutters 42 and the impeller/smasher 44.

The bearing/spacer/cutter blocks 43 and 45 are preferably multi-lobed blocks having spaces or apertures between the lobes for permitting passage of the liquid and solid materials therethrough. The blocks 43 and 45 are horizontally mounted within the housing 34 by means of a conventional fastener or bolt 47. The block 43 (see FIG. 6) provides smooth horizontal upper surfaces 128 for contact with the lower smooth horizontal surfaces 127 of the rotating impeller/cutter 42 associated therewith A bearing (not shown) is disposed in collar portion 116 of block 43 for journalling shaft 36 therethrough for rotation. The impeller/cutter 42 has a plurality radially spaced blades (preferably four) and has an upper integral cylindrical collar portion 112 for concentric sliding engagement with shaft 36. A set screw 114 is disposed in collar 112 for engaging shaft 36 and mounting the impeller/cutter 42 thereto in a desired vertical position in engaging contact with block 43. Each projecting blade of the impeller/cutter 42 has a cutting or shearing knife-like edge 126 and slanted upper surface 125. As the impeller/cutter 42 rotates (clockwise) the knife-like edge 126 cooperates with the separated lobes or arms of the block 43 to cut and shear any solid materials caught therebetween. The upwardly slanted blade surfaces 125 act as a fan blade for "pushing" and "propelling" the liquid and entrained solid materials forming a macerated slurry upwardly within housing 34.

The blocks 45 (see FIG. 7) provides smooth horizontal upper surfaces 128' for contact with the lower smooth horizontal surfaces 127' of the rotating impeller/smasher 44 in rotating contact therewith. A bearing (not shown) is disposed in collar portion 122 of block 45 for journalling shaft 36 for rotation therethrough. One radially projecting upper edge of each arm or lobe of the block 45 has an upwardly slanting surface 130 for cooperating with the blades of impeller/smasher 44 or will be hereinafter further described. The impeller/smasher 44 has a plurality of radially spaced blades (preferably four) and has an integral collar portion 118 adapted for concentric sliding engagement with shaft 36. A set screw 120 is provided in collar 122 for engaging shaft 36 and mounting the impeller/smasher 44 thereto for rotation therewith in a desired vertical position in engaging contact with block 45. Each projecting blade of the impeller/smasher 44 has a knife-like shearing edge 126' that is spaced above the horizontal surfaces 128' of the blocks 45 and separated therefrom by an angled surface 132 projecting upwardly from the lower blade surface 127'. Each arm or blade of the impeller/cutter 44 has an upwardly slanted surface 125' communicating with the knife-like searing edge 126'. As the impeller/smasher 44 rotates (clockwise) the knife-like edge 126' and lower surface 132 cooperate with the separated lobes or arms of the block 45 and the slanted edge surfaces 130 disposed thereon to engage solid materials caught therebetween and to smash and shear the larger solid materials into smaller pieces. As previously described in relation to impeller/cutter 42, the upwardly slanted surfaces 125' act as a fan blade for drawing the liquid and entrained solids (macerated slurry) through the rotating impeller/smasher and forcing the slurry stream upwardly within the housing 34. The combined action of the impeller/cutter assemblies 42–43 and the impeller/smasher assembly 44–45 will smash, shear, cut, pulverize and macerate virtually all solid materials entrained in the liquid in tank 16 and drawn into compartment or housing 34.

Referring now to FIGS. 1–3 and 8–11, the secondary disposal unit 30 will be described in greater detail. The secondary disposal means 30 cooperates with tank section 18 and comprises a float-actuated telescoping pipe assembly as means 57 disposed within tank 18, a vacuum pump 84 for drawing vapor and fluid particles from inside tank through the pipe means 57, a heater 78 for vaporizing the moisture and particulate material entrained in the air flow through pump 84, and out to the ambient through piping and a conventional cinder trap and/or spark arrestor 89. The pump 84 is mounted by means of a bracket 85 to the top 26 of the receptacle 12.

A telescoping first pipe section 58 is supported in a vertical position by mounting to cover 26 and extends downwardly therefrom centrally into the interior of tank 18. Disposed concentrically around pipe 58 is a shorter telescoping pipe section 60 that cooperates with pipe 58 to permit pipe 60 to slide upwardly and downwardly with respect thereto. By means of a press fit at location 61 are pipe 60, a "seal" is formed which will be snug enough to prevent substantial invasion of air vapor inside of tank 18 into pipes 58 and 60 at their juncture, but which is also "loose" enough to permit easy sliding contact with the outer surfaces of pipe 58. Pipes 58 and 60 are preferably constructed of chemical, oxidation and biologically resistant materials, such as plaster or coated metals, such as galvanized steel. Of course, the "fit" at 61 may be a press fit as described above, or may be accomplished by means of a ring seal, such as an O-ring, disposed between pipes 58 and 60.

The float assembly 62 has a central bore 72 disposed therethrough for receiving and accommodating the lower end of pipe 60 and is adjustably positionable axially with respect thereto by retention means 63 which will be hereinafter described in greater detail. The float 62 is sized to support the weight of the float and the supported pipe section 60 on the surface 17 of the slurry 15 (primarily water and suspended solid particulate matter) as shown best in FIGS. 2 and 8. The lower edge 61 of pipe section 60 has disposed therein slots or notches 61' for purposes to be hereinafter further explained. The float 62 also has a plurality of slots 64 radially therethrough and communicating with the interior bore 72.

The lower end of pipe 60 may be adjustably positioned axially within bore 72 by means of the fastening or engaging means 63 in order to position the lower edge 61 and notches or slots 61' at the surface 17 of the slurry 15 in tank 18 in order to permit communication of air and vapor 65 within tank 18 through float slots 64 into the interior of pipes 60 and 58 for being forced by pump 84 to the heating means 78. The adjustment of the pipe edge 61 and slots 61' with respect to the slurry surface 17 will be further explained below.

Float 62 comprises a float body 71, constructed of any durable, chemically resistant material that has a specific gravity less than water, a rigid upper plate 64 mounting a pipe engaging means 63 and an interior liner member 69 disposed in the axial bore 72 and slidably engaging the lower end of pipe 60. A pair of rods 66 and 67 are attached at one end to the float plat 64 and extends vertically upwardly and generally parallel to pipe sections 60 and 58 through the cover 26. Rod 66 is provided with first and second stop members 68 and 70, respectively, which cooperate with a switch 74 to form a portion of a first automatic control system to be hereinafter described. The rods 66 and 67 together act as guides for the vertical up and down movement of the float 62 and prevent twisting or rotational motion of the float and attached pipe 60 with respect to the pipe 58. The secondary disposal unit 30 further includes a heater 78 positioned so as to heat and vaporize the liquid material suspended in vapor discharged by vacuum motor 84 into discharge stack 87, thereby also purifying by elevated temperature the vaporized material and vapors in tank 18 drawn through pipes 58-60 and through the float slots 64. In a preferred embodiment, the heater is an electrical heater element 78, which when activated, has sufficient energy to elevate the vaporized material and vapors passing therethrough to a preselected temperature which is 300° F. or greater. A temperature sensing transducer 80 is further disposed preferably in the secondary disposal unit 30 for purposes of sensing the temperature of the vapor created by the heater 78. This sensor 80 will be described in greater detail with respect to a second automatic control system.

With particular reference to FIGS. 8-11, further details of the float assembly 62 will now be described. The retention means 63 is mounted on the top plate 64 and compresses a pair of opposing semi-circular clamping assemblies for releasably gripping the second pipe 60. Each such clamping assembly includes a generally L-shaped member having a vertically upright arcuate-shaped portion 152 (152') for engaging the side of the pipe 60 and a horizontal flanged portion 153 (153') adopted for sliding contact with the float top plate 64. Each flanged portion 152 (152') includes a plurality of parallel slots 158 (158') that accept fasteners 156 therethrough to provide means for adjusting and clamping the relative radial position of each upright portion 152 and 152' with respect to each other and the pipe section 60. The inner face of each upright portion 152 and 152' has a protective pad 150 disposed thereon for engaging the opposite outer wall surfaces of pipe 60. Attached concentrically to the outer surface of each upright portion 152 (152') of the L-shaped clamping member is a generally semicircular collar member 154 having oppositely-spaced radially outwardly projective flanges 155 (157), respectively. The flanges 155 and 157 are transversely spaced in opposing relation to each other and may be reversibly attached to each other by means of a conventional fastener 160, such as a nut and bolt. When adjusting the vertical positioning of pipe 60 within the float bore 72, the fasteners 160 may be removed and the fasteners 156 loosened in order to allow the L-shaped clamping members to be moved radially with respect to the bore 72 and pipe 60. The pipe 60 can then be vertically positioned with respect to the bore 72 and slots 64 as will hereinafter described in more detail. When positioned as desired, the L-shaped clamp members are moved radially toward the walls of pipe section 60 until the arcuate portions 152 (152') and pads 150 (150') snugly engage opposing walls of the pipe 60. The fasteners 156 are then tightened to hold the opposing clamping members in place in snug contact with pipe 60. The fasteners 160 are then applied to engage the opposing collar end flanges 155 and 157. The fasteners 160 ar tightened to apply radially inwardly directed forces to each collar member 154 for securely clamping the upright portions 152 and 152' to the pipe 60 to hold the pipe in the desired portion with respect to float 62.

Figure 11:
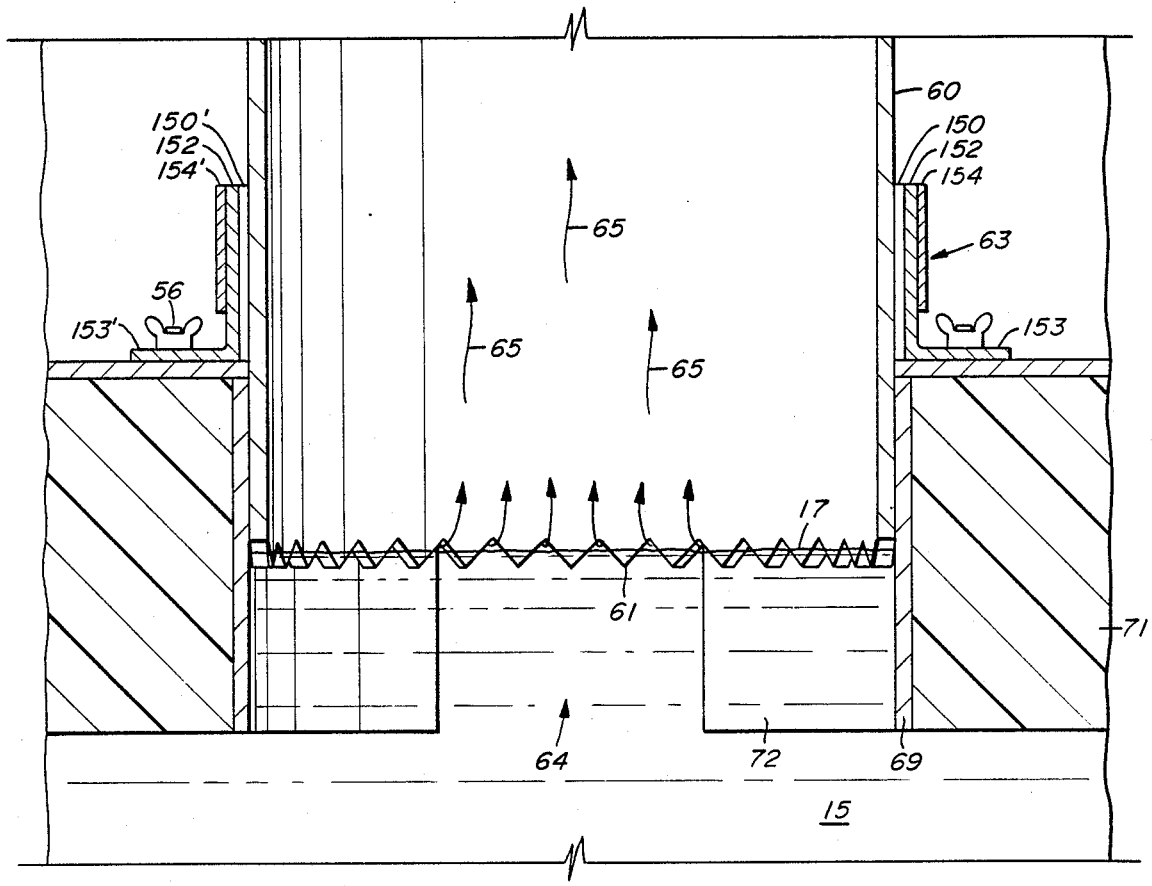
FIG. 11 is an enlarged fragmentary vertical cross-sectional view of the float member of the secondary conditioning unit.

As may best be described with reference to FIG. 11, the adjustment of pipe 60 within the float 62 is important to the proper operation of the secondary disposal unit 30. Where the float 62 is floating in the fluid 15 in tank 18, the float will assume a relative position in the slurry with respect to the fluid surface 17 and with a lower portion of the float body 71 submerged and an upper portion of the float body 71 and the engaging means 63 projecting above the fluid surface. It is necessary to adjust the lower end 61 of pipe 60 with respect to the fluid surface 17 as shown in FIG. 11 in order to just position the lower pipe edges 61 in contact with the fluid surface 17 and maintain the slots or openings 61' above the fluid surface 17 to provide a continuous means of vapor communication between the interior of tank 18 and the interior of pipe 60.

The slots 61' act as a "carburetor" intake into the interior of pipes 60 and 58, since the flow of air and vapor from the interior of tank 18 through the small slots 61' (generated by the action of vacuum pump 84 as hereinabove described) will create a venturi effect therethrough in the slots exposed at the float slots or openings 64. This high velocity venturi effect of the vapor and air flow through the slots or notches 61' will draw water particles and suspended particulate matter into the interior of pipe 60 to be carried in the air stream therein as shown at 65. The water particles and suspended particulate matter from the macerated slurry entrained in the air flow will be carried to the heating means 78 for vaporization as previously described. If the end 61 of pipe 60 is submerged too much in the fluid 15, then slots 61' will be too small, or perhaps blocked, and insufficient air flow therethrough will result. If the slots 61' are opened too much, or if pipe end 61 is not in contact with the surface 17 of the fluid in the tank, then the venturi effect will be lost and an insufficient water particle and suspended particulate matter mix will be drawn into the pipe 60.

Referring to FIGS. 1-4 and as hereinabove described, the vacuum pump 84 is provided for drawing the air and vapor contained in the tank discharge stack 87. A second function of the pump 84 is that as described above providing a carburetion type action. The discharge stack 87 will preferably include a damper flap 86 which, when opened, will permit vaporized material to pass through the stack outwards to the ambient through the cinder trap 89, and to prevent such passage when the damper is in the closed position. Automatic operation of the damper flap 86 will be hereinafter described with respect to the aforementioned second automatic control system.

The above mentioned first, second, and third automatic control systems will now be described in greater detail. Regarding the first system, a level switch 74 will be arranged relative to the rod 66 and stops 68 and 70 whereby vertical upward and downward movement of the float 62, which is tracking the slurry level in the second tank 18, causes interaction between the rod stops 68 and 70 and the switch 74 in the following manner.

When the rod 66 rises by reason of the float 62 rising to a sufficiently high level whereby the first stop 70 contacts and actuates the switch 74, the first solenoid 76 is energized via connector 73. In this manner, a source 90 of electrical power, such as 110 or 220 VAC, is connected to the heater element 78 by means of the conductors 77 and 91 through solenoid 76. However, when the liquid level in the tank 18 lowers, causing the float 62 and rod 66 to move in a generally downward direction, when the second stop 68 of the rod 66 contracts the level switch 72, the solenoid 76 is deactivated thereby removing electrical power from the heater 78. Of course, the heater 78 may be a gas fired burner (not shown) which may be controlled in the same manner as herein described for an electrical heating element.

In this manner, it may be appreciated that as long as the liquid level rises to a predetermined height defined by positioning of the first stop, the heater 78 will be continually energized to vaporize the liquid particulate matter contained in the tank 18 and delivered to the heater in suspension. However, when the liquid level drops to a sufficiently low level predefined by the position of the second stop relative to the rod 66, the heater 78 is thereby deactivated. This automatic control mechanism prevents the heater from operating without sufficient liquid material to vaporize, thus preventing dangerous and destructive overheating of the heater and the system.

The second automatic control system will now be described in greater detail. The temperature sensing transducer 80 will be positioned in an appropriate position in stack 87 as desired so as to sense the temperature of vapor discharged by heater 78, and is connected by conductor 88 to a second solenoid 82. A source of electrical power 90, such as the aforementioned 110 VAC, is also delivered by connection 77A to the solenoid 82. The vacuum pump 84 is also connected to the power source 90 by way of connection 92 through solenoid 82. Similarly, an electromechanical link 94 to the damper 86 is interconnected by conductor 92A to the solenoid 82. Thus, when the sensor 80 detects a preselected temperature, the second solenoid 82 will be actuated through connection 88. The power source 90 will in turn be connected by conductors 77A and 92 to the vacuum motor 84 for activating the motor. The damper flap 86 will also be actuated by the E-M link 94 to the "open" position through the electrical conductor 92A. Thus, the motor 84 will draw the air and vapor in the tank 18 and the particulate materials suspended therein through the pipe notches 61' (float 62) and upwards through the pipes 58 and 60 for subsequent vaporization by the heater 78. The motor 84 will further force the heat treated vapors out the discharge stack 87 and cinder trap 89 to the ambient when the damper 86 is opened.

When the temperature sensed by the sensor 80 falls below the preselected temperature level, the solenoid 82 is deactivated through connection 88, causing the power source 90 to be disconnected from the motor 84 and linkage 94, thus shutting off motor 84 and closing the damper 86. In this manner, raw vapors which have not been vaporized by the heater 78 will be prevented from escaping to the atmosphere.

The third automatic control system of the waste disposal system 10 of the present invention will now be described in greater detail. The flapper 24 is hinged to the discharge end of pipe 20 by a hinge 23. The flapper valve 24 has an integral arm 25 transversely extending past the hinge 23. A rod 96 is attached to the end 27 of arm 25 and projects generally in a vertical orientation through and above the top 26 of the container 12. Attached to the upper free end of rod 27 is a position sensing switch 98, such as a conventional mercury switch or the like. When the flapper 24 is moved by means of incoming waste material within the discharge pipe 20, the flapper valve is rotated downwardly about hinge 23 to a lower position as shown at 24'. The rotational movement of flapper 24 will also cause rod 96 to rotate arcuately to one side and move sensing switch 98 to position 98'. This movement of switch 98 actuates the switch to close an electrical connection to timer/solenoid 102 through appropriate wires or conductors 100. The timer/solenoid 102 interconnects the source of electrical power 90 (110 VAC) through connections 104 and 104A to the pulverizing and liquefying motor 38 for a preselected time period each time the switch 98 is actuated.

In a preferred embodiment of the invention, the timer 102 is set for a time period preferably between 5-15 minutes. Thus, each time a new batch of waste material is interjected through the pipe 20 into the system 10, the timer/solenoid 102 will activate for the prescribed period so as to cause the motor 38 to run for this period, thus breaking down the solids material in the waste product being delivered by the tube 20. When the motor has run for the preselected time period to mechanically break up the solids material, the timer/solenoid 102 is deactivated to prevent the motor 38 from unnecessarily running for extended periods of time.

Referring to FIG. 12, a second embodiment of the telescoping pipe/float assembly 257 disposed within tank section 18 is shown. The lower pipe 60 and the float 62 are of the same construction as hereinabove described, wherein the lower end 61 of the pipe is clamped within the float by the retainer means 63 and projects to the fluid surface 17 within the transverse float slots 64. Vertical rods 66 and 67, attached to the top surface of the float 62, extend through guide tubes 270 and the cover 26. The guide tubes 270 provide stability for the rods 66 and 67 and help guide the rods in a vertical direction and minimize lateral "cocking". Rod 66 also carries first and second actuating stops 68 and 70 for actuation of limit switch 72 as above described. However, as shown, one end 83' of pipe section 83, interconnecting fan 84 with the tank 18 comprises a short stub section projecting downwardly from tank top 26 and axially aligned with the upwardly projecting movable tube pipe section 60. Interconnecting the pipe stub 83' and the upper end of the movable pipe section 60 is a section of a collapsible bellows-type tubing 258. The upper and lower ends 262 and 260, respectively, of the tubing 258 are fastened to the pipe stub 83' and the upper end of movable pipe 60, respectively, by means of suitable conventional fastening bands or clamps 266.

The tubing 258 may conveniently be an accordion-pleated steel wire-reinforced rubber or plastic hose that has exterior and interior pleats or folds 264 and 265 for permitting the tubing 258 to stretch and fold in accordion-like fashion as the movable pipe section 60 rises and falls vertically within tank 18 in response to the changes in the fluid level 17 within the tank. The other functions previously described of the vacuum fan 84 drawing air and vapor from inside tank 18 through float slots 6 and providing the carburetion action of drawing particulate-sized water droplets and suspended particulate matter 65 into the air stream within pipe 60, tubing 258 and pipe 83 to the fan 84 for being heated are identical to the functions hereinabove previously described. In addition, rod 67 carries an actuating stop 70' that can coact with and actuate a mercury switch as microswitch 272 that will be actuated if the float 62 rises above a preselected upper safety level after stop 70 and rod 66 have actuated microswitch 72 as hereinabove described. Continued rising of the fluid level 17 in tank 18, even with the vacuum pump system switched "on" indicates that the water and particulate matter in tank 18 is accumulating faster than it can be withdrawn through the tubing 258 and vaporized. Actuation of switch 272 can be used as an emergency "shut-down" of the system and/or activate an appropriate audio or visual alarm to notify the waste disposal system owner of the problem in order that the system can be adjusted to correct the problem. The accordion-pleated tubing 258 embodiment will generally be employed to increase the volume of vaporization of the waste liquid and suspended particulate solid materials above 500 gallons per 24-hour period. Of course, it can be understood that multiple sets of tubing/pipe/float assemblies 257 could also be disposed in tank 18 in order to increase the volume of waste material handled by the system.

It will be appreciated that the system 10 of the present invention hereinbefore described may be used in conjunction with underground evaporating or septic systems as desired, and is accordingly not intended to be limited only to self-contained above ground installations. Thus, in this alternate embodiment, the system 10 can be used to service underground septic fields. In an illustration of such an application, the discharge pipe 20 will preferably be routed, for example, to an overflow or spillover tank (not shown) which is adapted to receive waste material from an overloaded evaporating field. Alternatively, pipe 20 may be routed to apparatus which is adapted to periodically vacuum or pump out a septic field. Whereas the underground septic system may continue to perform its intended function, excess capacity provided by the system 10 will prevent overloading of untreated waste material which may undesirably flood the field, thus contaminating the surrounding area. Moreover, the system 10 may be used in conjunction with a more conventional septic system not only in providing for excess capacity, but for operating upon a portion of the effluent in the evaporating field in conjunction therewith which may be pumped to system 10.

It is therefore apparent that the present invention is one well adapted to attain all of the advantages and features hereinbefore set forth, together with other advantages which will become apparent from a description of the apparatus itself. It will be understood that certain combinations and subcombinations are of utility and may be employed without reference to other features and subcombinations. Moreover, the foregoing disclosure and description of the invention is only illustrative and explanatory thereof, and the invention admits of various changes in the size, shape, and material composition of its components as well as in the details of the illustrated construction and method without departing from the scope and spirit thereof.

I claim:

1. A method for above-ground disposition of waste materials including water and water soluble solid materials, comprising the steps of
    shredding the solid materials in the water into small particles,
    agitating the water and small shredded particles of solid materials for obtaining a macerated slurry comprising the water and shredded particles of water solution solid materials,
    transferring a volume of said slurry into a closed container,
    establishing an elongated conduit defining a confined volume vapor flow path communicating between said closed container and ambient atmosphere,
    sensing the level of said slurry in said closed container as said slurry rises and falls between first and second predetermined levels,
    initiating heating of said confined volume vapor flow path at a selected location in response to said slurry level rising above said first predetermined level,
    sensing the heating temperature at said selected heating location,
    establishing a partial vacuum within said confined volume vapor flow path for drawing air and vapor from said closed container into said flow path in response to sensing the heating temperature rising above a first preselected temperature,
    restricting communication between said confined volume vapor flow path and said closed container at the surface level of said slurry for drawing air and vapor from said closed container into said confined volume flow path in response to said establishing a partial vacuum therein, said restricted communication between said confined volume flow path and said closed container creating an increased flow velocity of said air and vapor due to the venturi effect therein,
    generating a mixture of air and vapor with particles of said slurry as said increased velocity air and vapor pass over said slurry surface at said point of restricted communication between said closed container into said confined volume flow path,
    vaporizing the liquid and solid particles entrained in said air and vapor mixture with said slurry particles when said volume passes through said heated flow path at said selected location therein,
    discharging said vaporized product into the ambient atmosphere,
    discontinuing heating of said confined volume vapor flow path at said selected location in response to said slurry level falling below said second predetermined level, and
    terminating said partial vacuum established within said confined volume vapor flow path in response to sensing the heating temperature falling below a second preselected temperature.

2. The method as described in claim 1, further including the steps of
    opening said confined volume vapor flow path downstream of said heating location in response to sensing the heating temperature rising above said first preselected temperature for permitting discharge of said vaporization products to the ambient atmosphere, and
    closing said confined volume vapor flow path downstream of said heating location in response to sensing the heating temperature falling below said second preselected temperature.

3. The method as described in claim 1, further including the initial steps of
    detecting an input flow of said waste materials, and
    initiating a predetermined timing sequence in response to detecting said input flow of said waste materials for determining the time duration of said shredding and agitating steps.

4. Apparatus for above-ground disposition of waste materials including water and water soluble solid materials, comprising a first container for receiving said waste materials, inlet means for delivering said waste materials into said first container, preconditioning means cooperating with said first container for shredding the solid materials in the water therein into small particles and agitating the water and said small shredded particles of solid materials for obtaining a macerated slurry comprising the water and said shredded particles of water soluble solid materials, transfer pipe means for transferring a volume of said slurry from said first contaianer into a closed second container, conduit means for establishing a confined vapor flow path communicating between said closed second container and ambient atmosphere, said conduit means including telescoping pipe means disposed within said closed second container and adapted for limited vertical movement therein, float means cooperating with said telescoping pipe means for floating on the surface of said slurry in said closed second container and moving vertically in response to the rise and fall of said surface level of said slurry, and guide means cooperating with said float means and said telescoping pipe means for guiding and maintaining said float means and telescoping pipe means in a selected vertical axial path during said float means vertical movement in response to changes in said slurry surface level, a vacuum pump cooperating with said conduit means downstream of said telescoping pipe means for establishing a partial vacuum within said telescoping pipe means for drawing air and vapor from said closed second container into said telescoping pipe means, aperture means cooperating with said telescoping pipe means and said float means for restricting communication between the interior of said telescoping pipe means and said closed container at the surface level of said slurry for drawing air and vapor from said closed container into said telescoping pipe means in response to said vacuum therein, said aperture means restricting vapor communication between said telescoping pipe means and said closed second container for creating an increased flow velocity of said air and vapor due to the venturi effect therein, and establishing a mixture of air and vapor with particles of said slurry as said increased velocity air and vapor passes over said slurry surface in cooperation with said aperture means, level sensing means for sensing the level of said slurry in said closed second container as said slurry rises and falls between first and second predetermined levels and generating electrical signals in response thereto and representative thereof, a heater cooperating with said conduit means upstream of said vacuum pump for heating said vapor flow path therein at a selected location, first switch means for activating said heater means in response to receiving said electrical signal representative of said slurry level rising above said first predetermined level, temperature sensing means for sensing the heating temperature at said selected heating location and generating electrical signals representative thereof, and second switch for means for activating said vacuum pump in response to receiving an electrical signal representative of said heating temperature rising above a desired preselected temperature, said heater vaporizing the liquid and solid particles entrained in said air and vapor mixture with said macerated slurry particles when said mixture passes said selected heating location in said conduit means, wherein said heater is deactivated by said first switch means in response to receiving an electrical signal representative of said slurry level falling below said second predetermined level, and wherein said vacuum pump is deactivated by said second switch means in response to receiving an electrical signal representative of said heating temperature falling below said second predetermined temperature level.

5. The apparatus as described in claim 4, further including damper means cooperating with said conduit means downstream of said heating means and said second switch means for opening said conduit means in response to said second switch means receiving said electrical signal representative of said heating temperature rising above said first predetermined temperature and permitting discharge of said remaining heated air and vapor after said vaporization step to the ambient atmosphere, and closing said conduit means in response to said second switch means receiving said electrical signals.

6. The apparatus as described in claim 5, wherein said damper means comprises a damper member disposed in said conduit means downstream of said heater and adapted for opening and closing said conduit means to ambient atmosphere, and electro-mechanical linkage means driving said damper member for opening and closing said conduit means in response to electrical signals received from said second switch means.

7. The apparatus as described in claim 4, wherein said preconditioning means comprises a columnar housing projecting vertically into said first container and having a lower intake opening and an upper discharge opening, a vertical shaft extending within and coaxially within said housing, a plurality of impeller/cutting means spaced vertically apart along and carried by said shaft for shredding and agitating said solid materials and waste water to form an macerated slurry and transferring said slurry from said lower intake opening through said impeller/cutting means and said housing and out of said upper discharge opening, wherein each of said impeller/cutting means includes a plurality of rotatable cutting blades, and a stationary block having a plurality of fixed blades mounted in said housing and journalling said shaft for rotation, said plurality of fixed blades adapted for rotating sliding engagement with said plurality of rotatable cutting blades, and a motor for rotating said vertical shaft and actuating said impeller/cutting means.

8. The apparatus as described in claim 7, wherein said transfer pipe means comprises an inverted U-shaped pipe communicating between said first and second containers, the end of said pipe projecting into said first container having an open end and openings in the pipe side walls for admitting said slurry therein, and screening means cooperating with said pipe open end and side wall openings for admitting water and solid particles smaller than a preselected particle size capable of being mixed with and entrained in said air and vapor flow in cooper-ation with said aperture means, wherein said pipe end and screening means cooperating therewith further cooperate with said preconditioning means upper discharge opening for permitting washing of said screening means by said slurry discharged therefrom.

9. The apparatus as described in claim 7, further including a flapper valve carried by one end of said inlet means into said first container and adapted to move into a open position upon passage of said waste materials therethrough and into a closed position upon absence of said waste materials passing therethrough, a position sensing switch for sensing said movement of said flapper valve to said open and said closed positions, and timer means interconnected between said motor for rotating said vertical shaft and said position sensing switch for electrically activating said motor for a preselected time period each time said switch senses movement of said flapper valve from said closed to said open switch.

10. The apparatus as described in claim 4, wherein said telescoping pipe means comprises a first pipe section mounted for downward vertical projection into said closed second container and having a lower open end and an upper discharge end adapted for interconnection to the input of said vacuum pump and communicating with said conduit means, a second pipe section coaxially registering with said first pipe section and adapted for limited telescoping sliding movement with respect thereto and maintaining continuous mating communication with said lower end thereof, the lower free end of said second pipe section carrying said aperture means and cooperating with said float means for causing vertical telescoping movement of said second pipe section with respect to said first pipe section in response to vertical movement of said float means with respect to the varying surface level of said slurry, and sealing means adapted for sliding cooperation between the coaxially engaged portions of said first and second pipe sections for preventing any substantial air flow therebetween.

11. The apparatus as described in claim 10, wherein said aperture means comprises a plurality of circumferentially-spaced longitudinally oriented slots disposed about the periphery of said second pipe lower end and adapted for cooperating with said float means for adjustably positioning and maintaining said second pipe lower end and said slots in contact with said slurry surface level for providing restricted communication through said plurality of slots between the interior of said second pipe section and said closed second container at said surface level of said slurry.

12. The apparatus as described in claim 11, wherein said float means comprises a float member adapted for floating on the surface of said slurry and moving vertically therewith in response to varying surface levels of said slurry within said closed second container, said float member having a central bore therethrough for receiving and accommodating the lower end of said second pipe section axially therein, said float member further having at least a pair of radial slots therethrough communicating between said bore and the outer surfaces of said float member above the surface level of said slurry, collar means disposed on said float member and cooperating with said bore therein and said second pipe section for adjustably positioning said second pipe section lower end axially within said bore and in contact with said slurry surface level for positioning said plurality of circumferential slots carried by said second pipe section end with respect to the surface level of said slurry to achieve a selected restriction of said slots with respect thereto and permitting restricted communication therethrough between the interior of said second pipe section and the closed second container through said at least a pair of radially disposed slots in said float member.

13. The apparatus as described in claim 12, wherein said guide means cooperating with said float means includes an elongated rod one end of which is attached to the top of said float member and projecting vertically upwardly therefrom, said rod adapted for vertical engaging movement with respect to said closed second container in response to vertical movement of said float for substantially prohibiting rotational movement of said second pipe member and attached float member with respect to said first pipe member during vertical telescoping movement therebetween.

14. The apparatus as described in claim 13, wherein said level sensing means comprises third switch means adapted for cooperating with said guide rod for actuation of said third switch means in response to the vertical movement of said float member between said first and second predetermined levels of said slurry in said closed second container.

15. The apparatus as described in claim 14, wherein said third switch means comprises a pair of stops disposed on the extending portion of said guide rod and corresponding to said first and second predetermined slurry surface levels, and a switch positioned adjacent said guide rod and adapted for engaging said first and second stops thereon and generating said electrical signals in response thereto and representative of said first and second predetermined slurry surface levels.

* * * * *